(12) United States Patent
Go et al.

(10) Patent No.: US 12,062,096 B2
(45) Date of Patent: Aug. 13, 2024

(54) METHOD AND SYSTEM FOR PROVIDING ACTIONABLE INTELLIGENCE

(71) Applicant: JPMorgan Chase Bank, N.A., New York, NY (US)

(72) Inventors: Changsu Go, Upper Saddle River, NJ (US); Daniel Schiemert, Bad Neuhaim, DE (US); Rijo Paul, Morganville, NJ (US); Sandeep Korgaonkar, Bridgewater, NJ (US); Radakichenane Vengatatry, Princeton, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 85 days.

(21) Appl. No.: 17/448,582

(22) Filed: Sep. 23, 2021

(65) Prior Publication Data
US 2023/0091441 A1 Mar. 23, 2023

(51) Int. Cl.
*G06Q 40/06* (2012.01)
*G06F 9/451* (2018.01)

(52) U.S. Cl.
CPC ............ *G06Q 40/06* (2013.01); *G06F 9/451* (2018.02)

(58) Field of Classification Search
CPC ................................ G06Q 40/00; G06Q 40/06

USPC ..................................................... 705/35, 38
See application file for complete search history.

(56) References Cited

U.S. PATENT DOCUMENTS

| | | | |
|---|---|---|---|
| 2007/0094119 A1* | 4/2007 | Marques | G06Q 40/04 705/36 R |
| 2019/0164134 A1* | 5/2019 | Morrow | G06Q 10/1057 |
| 2020/0134717 A1* | 4/2020 | Hunsaker | G06Q 40/03 |

* cited by examiner

*Primary Examiner* — Kirsten S Apple
(74) *Attorney, Agent, or Firm* — Greenblum & Bernstein, P.L.C.

(57) ABSTRACT

A method for providing actionable intelligence in real-time to facilitate a plurality of transactions is disclosed. The method includes compiling historical activity data for potential clients; defining, by using a model, a score for each of the potential clients based on the compiled historical activity data; receiving, via an event stream, a request, the request relating to a transaction request for a financial instrument; retrieving client coverage data that corresponds to the potential clients, the client coverage data including a strategic client plan that relates to development of client relationships; identifying a predetermined rule that corresponds to the request; and automatically determining, in real-time for the request, a recommended client from the potential clients based on at least one from among the score, the client coverage data, the corresponding predetermined rule, and the historical activity data.

20 Claims, 5 Drawing Sheets

METHOD AND SYSTEM FOR PROVIDING ACTIONABLE INTELLIGENCE

BACKGROUND

1. Field of the Disclosure

This technology generally relates to methods and systems for actionable intelligence, and more particularly to methods and systems for providing actionable intelligence in real-time to identify recommended transaction participants and facilitate a corresponding transaction.

2. Background Information

Many financial instrument brokers facilitate transactions between numerous potential participants by identifying compatible clients for a variety of solicitations such as, for example, a request for quote (RFQ). Often, the numerous potential participants each have different requirements that must be paired with requirements of the solicitations. Historically, conventional techniques for facilitating transactions between the potential participants and the solicitations have resulted in varying degrees of success with respect to timeliness and optimal pairing.

One drawback of using conventional techniques for facilitating transactions between the potential participants and the solicitations is that in many instances, the transactions must be accomplished quickly to realize maximum transaction efficiency. As a result, any delay in the transaction process may escalate and result in reduced profitability. Additionally, due to different requirements between the potential participants and the solicitations, an increase in timeliness often results in suboptimal pairing.

Therefore, there is a need for real-time actionable intelligence that identifies and recommends optimal pairings of potential participants with available solicitations to facilitate a corresponding transaction.

SUMMARY

The present disclosure, through one or more of its various aspects, embodiments, and/or specific features or sub-components, provides, inter alia, various systems, servers, devices, methods, media, programs, and platforms for providing actionable intelligence in real-time to identify recommended transaction participants and facilitate a corresponding transaction.

According to an aspect of the present disclosure, a method for providing actionable intelligence in real-time to facilitate a plurality of transactions is disclosed. The method is implemented by at least one processor. The method may include compiling historical activity data for a plurality of potential clients; defining, by using at least one model, at least one score for each of the plurality of potential clients based on the compiled historical activity data; receiving, via an event stream, at least one request, the at least one request may relate to a transaction request for a financial instrument; retrieving client coverage data that corresponds to the plurality of potential clients, the client coverage data may include a strategic client plan that relates to development of client relationships; identifying at least one predetermined rule that corresponds to the at least one request; and automatically determining, in real-time for the at least one request, at least one recommended client from the plurality of potential clients based on at least one from among the at least one score, the client coverage data, the corresponding predetermined rule, and the historical activity data.

In accordance with an exemplary embodiment, the method may further include generating at least one graphical element, the at least one graphical element may include information that relates to at least one from among the at least one recommended client, the corresponding at least one score, the corresponding client coverage data, the corresponding predetermined rule, and the corresponding historical activity data; and publishing the at least one graphical element to at least one graphical user interface based on a predetermined user preference.

In accordance with an exemplary embodiment, the method may further include receiving, via the at least one graphical user interface, feedback from at least one user, the feedback may include at least one adjustment to a threshold level; automatically updating, in real-time, the at least one recommended client based on the feedback; generating at least one updated graphical element, the at least one updated graphical element may include information that relates to at least one from among the updated at least one recommended client and the feedback; and publishing the at least one updated graphical element to the at least one graphical user interface based on the predetermined user preference.

In accordance with an exemplary embodiment, the historical activity data may include a desired position of at least one trader that is determined based on an associated security instrument that is officially recorded.

In accordance with an exemplary embodiment, the at least one request may include at least one from among a trade request, a request for quote, an invitation for bid, and an indication of interest.

In accordance with an exemplary embodiment, the at least one predetermined rule may correspond to at least one from among a predetermined guideline and an automatically generated guideline, the automatically generated guideline may relate to a requirement that is derived by using the at least one model, the historical activity data, the at least one score, and the client coverage data.

In accordance with an exemplary embodiment, the at least one model may include at least one from among a machine learning model, a statistical model, a mathematical model, a process model, and a data model.

According to an aspect of the present disclosure, a computing device configured to implement an execution of a method for providing actionable intelligence in real-time to facilitate a plurality of transactions is disclosed. The computing device comprising a processor; a memory; and a communication interface coupled to each of the processor and the memory, wherein the processor may be configured to compile historical activity data for a plurality of potential clients; define, by using at least one model, at least one score for each of the plurality of potential clients based on the compiled historical activity data; receive, via an event stream, at least one request, the at least one request may relate to a transaction request for a financial instrument; retrieve client coverage data that corresponds to the plurality of potential clients, the client coverage data may include a strategic client plan that relates to development of client relationships; identify at least one predetermined rule that corresponds to the at least one request; and automatically determine, in real-time for the at least one request, at least one recommended client from the plurality of potential clients based on at least one from among the at least one score, the client coverage data, the corresponding predetermined rule, and the historical activity data.

In accordance with an exemplary embodiment, the processor may be further configured to generate at least one graphical element, the at least one graphical element may include information that relates to at least one from among the at least one recommended client, the corresponding at least one score, the corresponding client coverage data, the corresponding predetermined rule, and the corresponding historical activity data; and publish the at least one graphical element to at least one graphical user interface based on a predetermined user preference.

In accordance with an exemplary embodiment, the processor may be further configured to receive, via the at least one graphical user interface, feedback from at least one user, the feedback may include at least one adjustment to a threshold level; automatically update, in real-time, the at least one recommended client based on the feedback; generate at least one updated graphical element, the at least one updated graphical element may include information that relates to at least one from among the updated at least one recommended client and the feedback; and publish the at least one updated graphical element to the at least one graphical user interface based on the predetermined user preference.

In accordance with an exemplary embodiment, the historical activity data may include a desired position of at least one trader that is determined based on an associated security instrument that is officially recorded.

In accordance with an exemplary embodiment, the at least one request may include at least one from among a trade request, a request for quote, an invitation for bid, and an indication of interest.

In accordance with an exemplary embodiment, the at least one predetermined rule may correspond to at least one from among a predetermined guideline and an automatically generated guideline, the automatically generated guideline may relate to a requirement that is derived by using the at least one model, the historical activity data, the at least one score, and the client coverage data.

In accordance with an exemplary embodiment, the at least one model may include at least one from among a machine learning model, a statistical model, a mathematical model, a process model, and a data model.

According to an aspect of the present disclosure, a non-transitory computer readable storage medium storing instructions for providing actionable intelligence in real-time to facilitate a plurality of transactions is disclosed. The storage medium comprising executable code which, when executed by a processor, may cause the processor to compile historical activity data for a plurality of potential clients; define, by using at least one model, at least one score for each of the plurality of potential clients based on the compiled historical activity data; receive, via an event stream, at least one request, the at least one request may relate to a transaction request for a financial instrument; retrieve client coverage data that corresponds to the plurality of potential clients, the client coverage data may include a strategic client plan that relates to development of client relationships; identify at least one predetermined rule that corresponds to the at least one request; and automatically determine, in real-time for the at least one request, at least one recommended client from the plurality of potential clients based on at least one from among the at least one score, the client coverage data, the corresponding predetermined rule, and the historical activity data.

In accordance with an exemplary embodiment, when executed by the at least one processor, the executable code may further cause the processor to generate at least one graphical element, the at least one graphical element may include information that relates to at least one from among the at least one recommended client, the corresponding at least one score, the corresponding client coverage data, the corresponding predetermined rule, and the corresponding historical activity data; and publish the at least one graphical element to at least one graphical user interface based on a predetermined user preference.

In accordance with an exemplary embodiment, when executed by the at least one processor, the executable code may further cause the processor to receive, via the at least one graphical user interface, feedback from at least one user, the feedback may include at least one adjustment to a threshold level; automatically update, in real-time, the at least one recommended client based on the feedback; generate at least one updated graphical element, the at least one updated graphical element may include information that relates to at least one from among the updated at least one recommended client and the feedback; and publish the at least one updated graphical element to the at least one graphical user interface based on the predetermined user preference.

In accordance with an exemplary embodiment, the historical activity data may include a desired position of at least one trader that is determined based on an associated security instrument that is officially recorded.

In accordance with an exemplary embodiment, the at least one request may include at least one from among a trade request, a request for quote, an invitation for bid, and an indication of interest.

In accordance with an exemplary embodiment, the at least one predetermined rule may correspond to at least one from among a predetermined guideline and an automatically generated guideline, wherein the automatically generated guideline may relate to a requirement that is derived by using the at least one model, the historical activity data, the at least one score, and the client coverage data, and wherein the at least one model may include at least one from among a machine learning model, a statistical model, a mathematical model, a process model, and a data model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
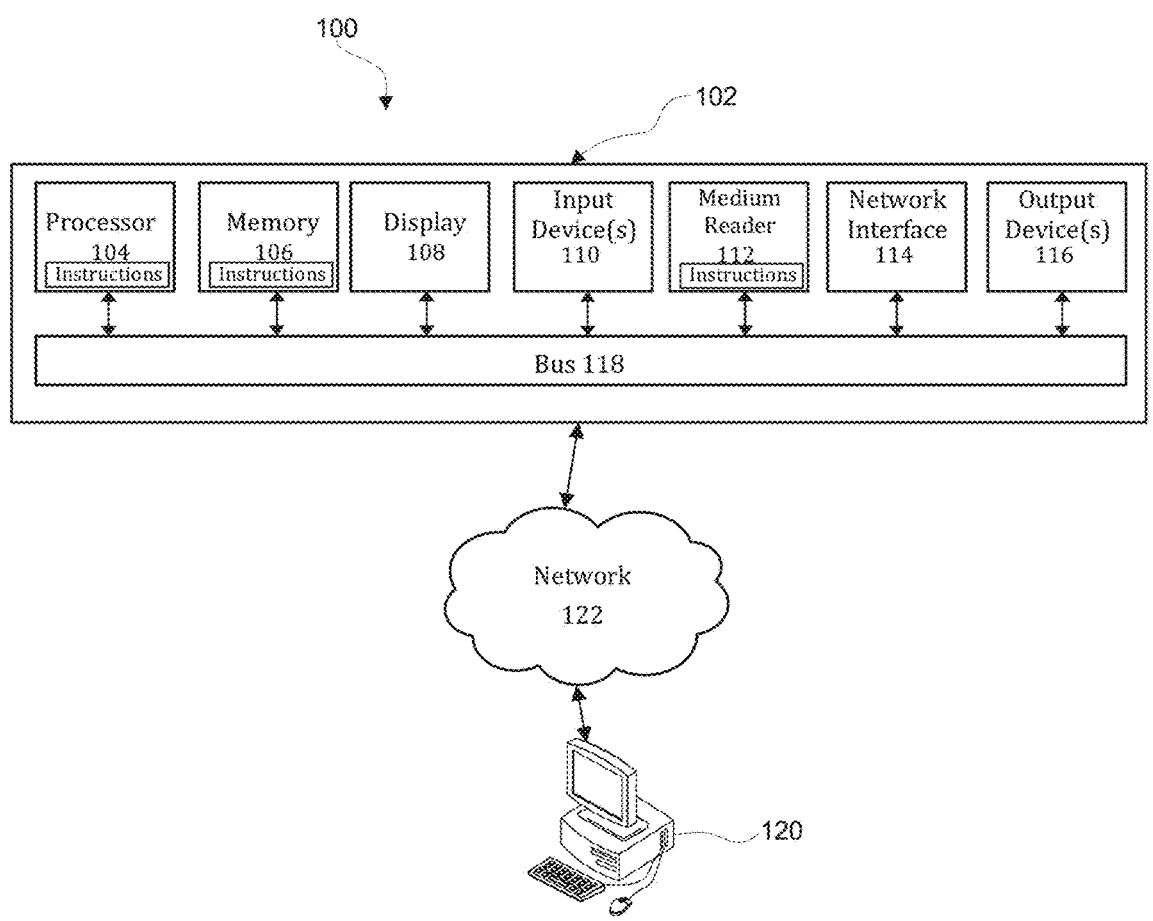
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing actionable intelligence in real-time to identify recommended transaction participants and facilitate a corresponding transaction.

Figure 2:
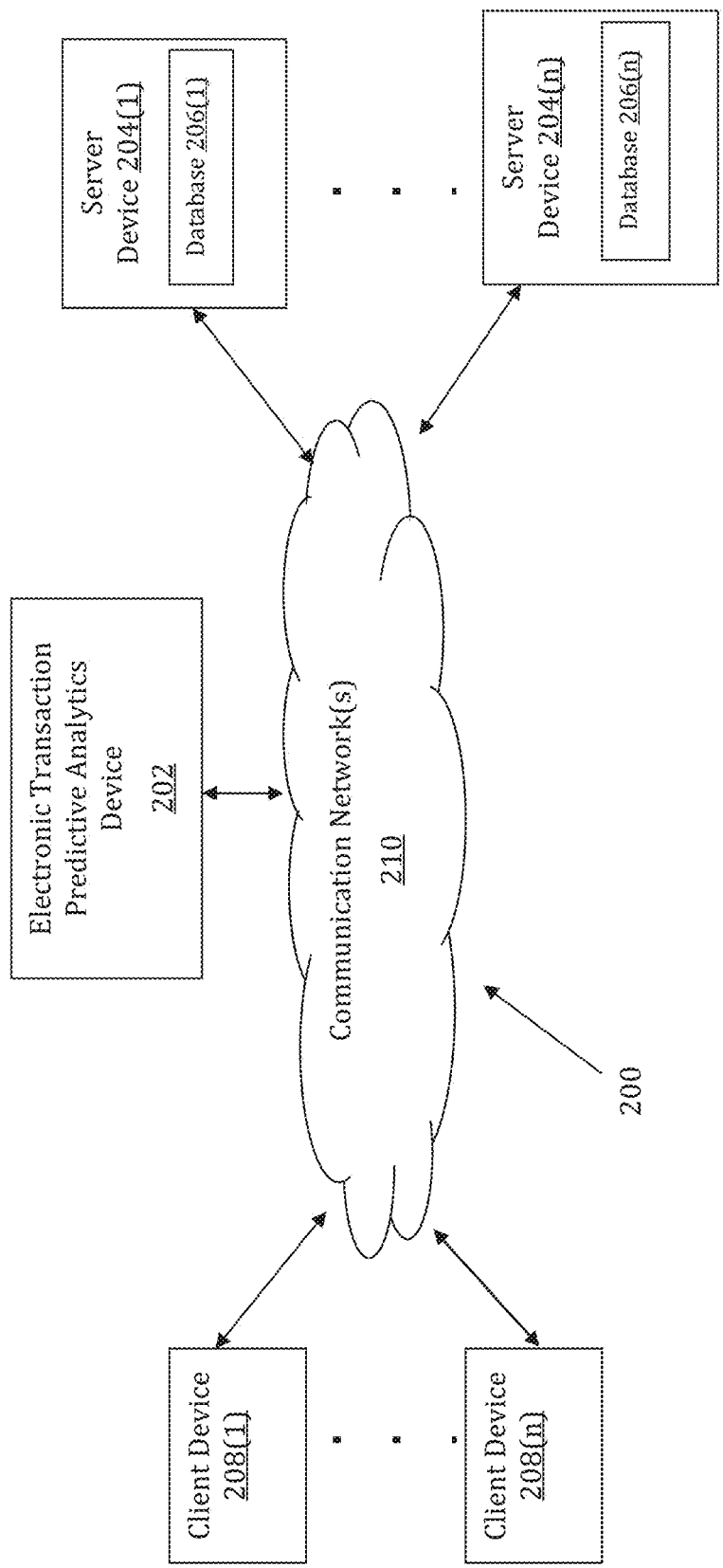
FIG. 2 illustrates an exemplary diagram of a network environment.

Referring to FIG. 2, a schematic of an exemplary network environment 200 for implementing a method for providing actionable intelligence in real-time to identify recommended transaction participants and facilitate a corresponding transaction is illustrated. In an exemplary embodiment, the method is executable on any networked computer platform, such as, for example, a personal computer (PC).

The method for providing actionable intelligence in real-time to identify recommended transaction participants and facilitate a corresponding transaction may be implemented by an Electronic Transaction Predictive Analytics (ETPA) device 202. The ETPA device 202 may be the same or similar to the computer system 102 as described with respect to FIG. 1. The ETPA device 202 may store one or more applications that can include executable instructions that, when executed by the ETPA device 202, cause the ETPA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ETPA device 202 itself, may be located in virtual server(s) running in a cloud-based computing environment rather than being tied to one or more specific physical network computing devices. Also, the application(s) may be running in one or more virtual machines (VMs) executing on the ETPA device 202. Additionally, in one or more embodiments of this technology, virtual machine(s) running on the ETPA device 202 may be managed or supervised by a hypervisor.

In the network environment 200 of FIG. 2, the ETPA device 202 is coupled to a plurality of server devices 204(1)-204(n) that hosts a plurality of databases 206(1)-206(n), and also to a plurality of client devices 208(1)-208(n) via communication network(s) 210. A communication interface of the ETPA device 202, such as the network interface 114 of the computer system 102 of FIG. 1, operatively couples and communicates between the ETPA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ETPA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ETPA devices that efficiently implement a method for providing actionable intelligence in real-time to identify recommended transaction participants and facilitate a corresponding transaction.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ETPA device 202 may be a standalone device or integrated with one or more other devices or apparatuses, such as one or more of the server devices 204(1)-204(n), for example. In one particular example, the ETPA device 202 may include or be hosted by one of the server devices 204(1)-204(n), and other arrangements are also possible. Moreover, one or more of the devices of the ETPA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ETPA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to transaction requests, event streams, client activity history, trader interests, machine learning models, score data, client coverage data, and actionable intelligence rules.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ETPA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ETPA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ETPA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ETPA device 202, the server devices 204(1)-204(n), or the client devices 208(1)-208(n), for example, may be configured to operate as virtual instances on the same physical machine. In other words, one or more of the ETPA device 202, the server devices 204(1)-204(n), or the client devices 208(1)-208(n) may operate on the same physical device rather than as separate devices communicating through communication network(s) 210. Additionally, there may be more or fewer ETPA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
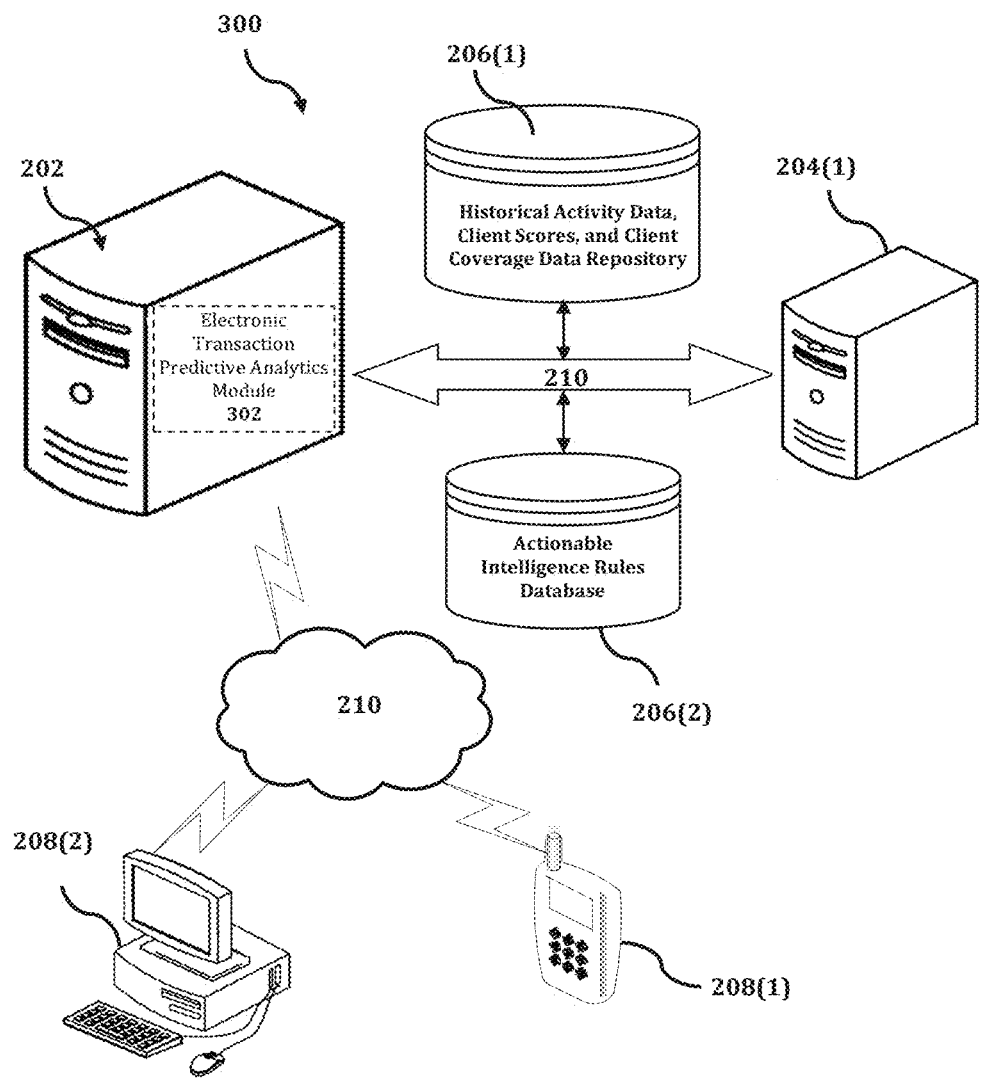
FIG. 3 shows an exemplary system for implementing a method for providing actionable intelligence in real-time to identify recommended transaction participants and facilitate a corresponding transaction.

The ETPA device 202 is described and shown in FIG. 3 as including an electronic transaction predictive analytics module 302, although it may include other rules, policies, modules, databases, or applications, for example. As will be described below, the electronic transaction predictive analytics module 302 is configured to implement a method for providing actionable intelligence in real-time to identify recommended transaction participants and facilitate a corresponding transaction.

An exemplary process 300 for implementing a mechanism for providing actionable intelligence in real-time to identify recommended transaction participants and facilitate a corresponding transaction by utilizing the network environment of FIG. 2 is shown as being executed in FIG. 3. Specifically, a first client device 208(1) and a second client device 208(2) are illustrated as being in communication with ETPA device 202. In this regard, the first client device 208(1) and the second client device 208(2) may be "clients" of the ETPA device 202 and are described herein as such. Nevertheless, it is to be known and understood that the first client device 208(1) and/or the second client device 208(2) need not necessarily be "clients" of the ETPA device 202, or any entity described in association therewith herein. Any additional or alternative relationship may exist between either or both of the first client device 208(1) and the second client device 208(2) and the ETPA device 202, or no relationship may exist.

Further, ETPA device 202 is illustrated as being able to access a historical activity data, client scores, and client coverage data repository 206(1) and an actionable intelligence rules database 206(2). The electronic transaction predictive analytics module 302 may be configured to access these databases for implementing a method for providing actionable intelligence in real-time to identify recommended transaction participants and facilitate a corresponding transaction.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ETPA device 202 via broadband or cellular communication. Of course, these embodiments are merely exemplary and are not limiting or exhaustive.

Upon being started, the electronic transaction predictive analytics module 302 executes a process for providing actionable intelligence in real-time to identify recommended transaction participants and facilitate a corresponding transaction. An exemplary process for providing actionable intelligence in real-time to identify recommended transaction participants and facilitate a corresponding transaction is generally indicated at flowchart 400 in FIG. 4.

Figure 4:
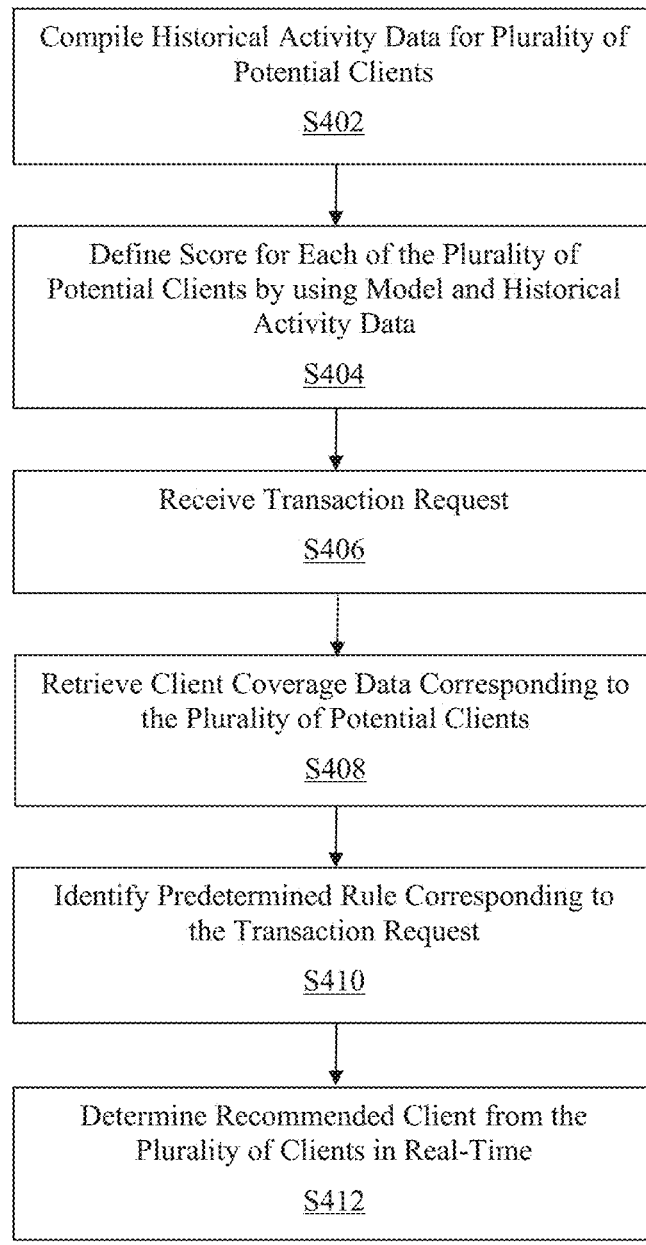
FIG. 4 is a flowchart of an exemplary process for implementing a method for providing actionable intelligence in real-time to identify recommended transaction participants and facilitate a corresponding transaction.

In the process 400 of FIG. 4, at step S402, historical activity data for a plurality of potential clients may be compiled. The historical activity data may relate to a history of past transactions, a history of past interests, and client portfolio data. In an exemplary embodiment, the historical activity data may be compiled from a plurality of networked sources. The historical activity data may be compiled from a first-party client source such as, for example, from an internal client data platform as well as a third-party client source such as, for example, a financial instrument exchange. In another exemplary embodiment, the plurality of potential clients may include a plurality of potential participants to a solicitation that corresponds to a financial instrument. For example, the plurality of potential clients may include a plurality of traders of the financial instrument.

In another exemplary embodiment, the historical activity data may include a desired position of a trader that is determined based on an associated security instrument that is officially recorded. For example, when a trader holds a long position but has short-term concerns, the trader may be very interested in short term put options. Similarly, when a trader has risk exposure to an increase in interest rates, the trader may be very interested in hedging against a risk of increasing interest rates.

At step S404, a score for each of the plurality of potential clients may be defined based on the compiled historical activity data. The score may be determined by using a model and the compiled historical activity data. In an exemplary embodiment, the score may relate to an evaluation of a potential client against a predetermined standard. The predetermined standard may relate to a likelihood that an interest of the potential client matches up with a requirement of a solicitation such as, for example, a request for quote (RFQ). For example, a trader with a high score based on past participation in short term put options may have an increased likelihood of participating in a solicitation relating to short term put options.

In another exemplary embodiment, the score may be used to rank the plurality of potential clients. The rank of the potential client may relate to a desirability of the potential client according to a current position of the potential client. For example, the score may be used to rank the plurality of potential clients based on follow through such that a higher ranked potential client is more likely to follow through when contacted by a broker. In another exemplary embodiment, the score may correspond to a ranking of the potential clients based on a predetermined business requirement. For example, the ranking of the potential clients may be based on existing client relationships.

In another exemplary embodiment, the model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S406, a request may be received via an event stream. The request may relate to a transaction request for a financial instrument. In an exemplary embodiment, the request may include at least one from among a trade request, an expression of inventor interest (AXE), a request for quote (RFQ), an invitation for bid (IFB), and an indication of interest (IOI). The request may be received from a variety of connected platforms. For example, the requests may be received directly via a first-party communication interface such as a chat interface as well as indirectly via a third-party such as an exchange platform.

In another exemplary embodiment, the request may be identified in an event stream from an application. The application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, the microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S408, client coverage data that corresponds to the plurality of potential clients may be retrieved. The client coverage data may include a strategic client plan that relates to development of client relationships. In an exemplary embodiment, the client coverage data may relate to corresponding industry related data for the plurality of potential clients. For example, the industry related data may include tech related data, healthcare related data, and industrials related data. In another exemplary embodiment, the client coverage data may be retried from a first-party client coverage platform as well as from a third-party data provider. The client coverage data may include processed data as well as raw data that are extracted from a data source.

At step S410, a predetermined rule that corresponds to the request may be identified. The predetermined rule may include an actionable intelligence rule that relates to business guidelines for the transaction of financial instruments. In an exemplary embodiment, the business guidelines may relate to a regulatory requirement as well as a business policy such as, for example, a policy to increase trade volume. For example, regulatory requirements may dictate the requirements for the transaction of certain financial instruments.

In another exemplary embodiment, the predetermined rule may correspond to at least one from among a predetermined guideline and an automatically generated guideline. The automatically generated guideline may relate to a requirement that is derived by using the at least one model, the historical activity data, the at least one score, and the client coverage data. Consistent with disclosures in the present application, the model may include at least one from among a machine learning model, a statistical model, a mathematical model, a process model, and a data model.

At step S412, a recommended client may be automatically determined in real-time for the request. The recommended client may be automatically determined from the plurality of potential clients based on at least one from among the score, the client coverage data, the corresponding predetermined rule, and the historical activity data. In an exemplary embodiment, the recommended client may be automatically determined based on a matching of client requirements and request requirements. The matching of the requirements may be performed in real-time. In another exemplary embodiment, a plurality of recommended clients may be identified. The plurality of recommended clients may be ranked based on a predetermine characteristic such as, for example, a matching percentage with the request. In another exemplary embodiment, the predetermined characteristic may be configurable by a user.

In another exemplary embodiment, a graphical element may be generated. The graphical element may include information that relates to at least one from among the recommended client, the corresponding score, the corresponding client coverage data, the corresponding predetermined rule, and the corresponding historical activity data. For example, the graphical element may include information relating to a matched pair that has been automatically determined consistent with disclosures in the present application. In another exemplary embodiment, the graphical element may be published to a graphical user interface based on a predetermined user preference. The predetermined user preference may indicate a preferred data presentation platform such as, for example, an email, a web browser, and a third-party software platform.

In another exemplary embodiment, feedback from a user may be received via the graphical user interface. The feedback may include an adjustment to a threshold level. The threshold level may correspond to at least one from among the score, the client coverage data, the corresponding predetermined rule, and the historical activity data. In another exemplary embodiment, the recommended client may be automatically updated in real-time based on the feedback. For example, based on the adjustment to a particular threshold level, the recommended client may change from client A to client B.

In another exemplary embodiment, an updated graphical element may be generated. The updated graphical element may include information that relates to at least one from among the updated recommended client and the feedback. Then, the updated graphical element may be published to the graphical user interface based on the predetermined user preference. Consistent with disclosures in the present application, the predetermined user preference may indicate a preferred data presentation platform such as, for example, an email, a web browser, and a third-party software platform.

Figure 5:
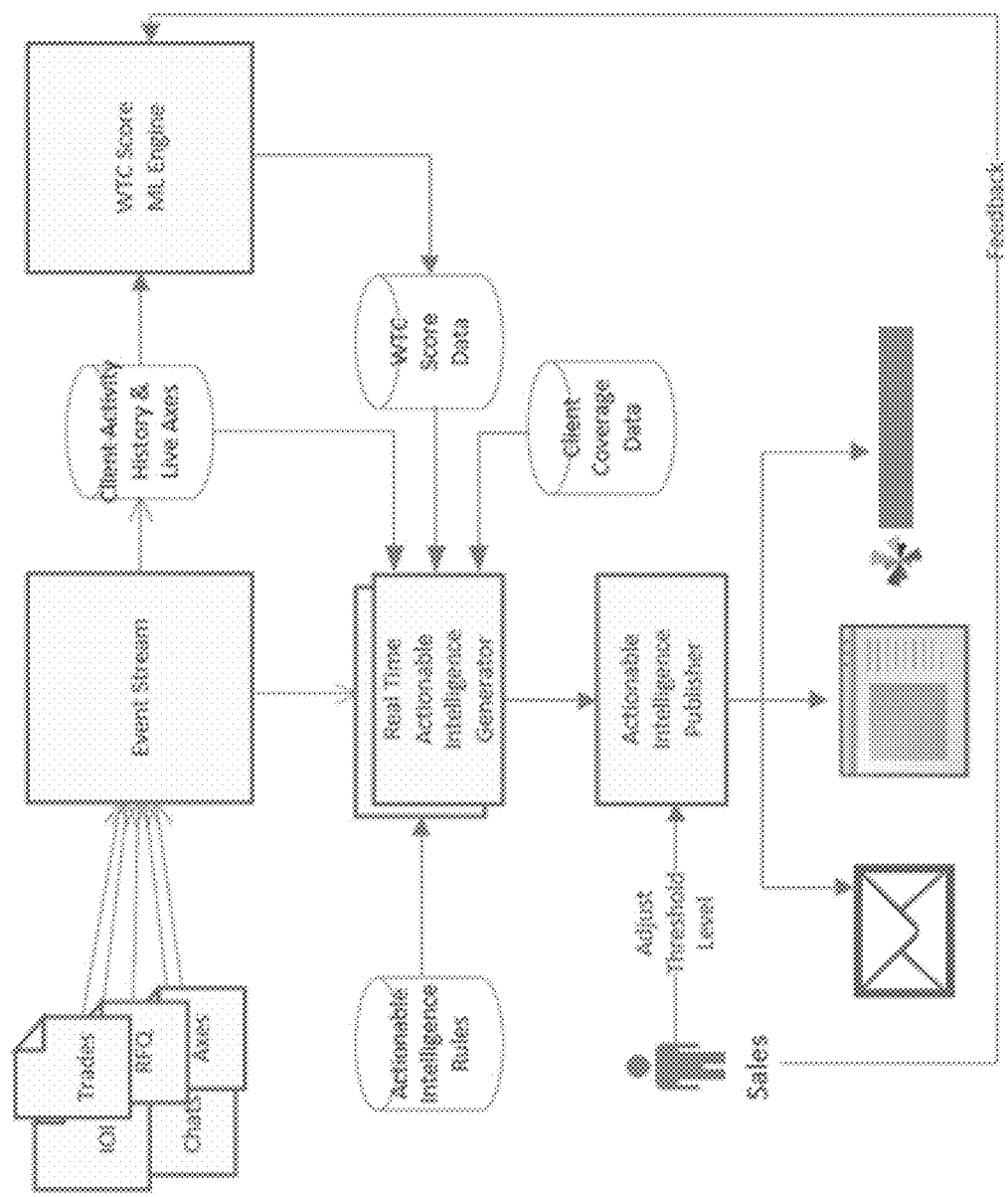
FIG. 5 is a flow diagram of an exemplary process for implementing a method for providing actionable intelligence in real-time to identify recommended transaction participants and facilitate a corresponding transaction.

FIG. 5 is a flow diagram 500 of an exemplary process for implementing a method for providing actionable intelligence in real-time to identify recommended transaction participants and facilitate a corresponding transaction. In FIG. 5, an actionable intelligence system implements a real-time event processor to generate actionable insight for a user. The actionable insight may be filtered by client coverage to facilitate contact with an optimal client for a potential deal in real-time.

As illustrated in FIG. 5, requests such as, for example, request for quotes (RFQs) may be retrieved by the real-time actionable intelligence generator via an event stream. The event stream may also provide the requests to a client activity history and trader interest (AXE) service for persistence. The real-time actionable intelligence generator may access the client activity history and trader interest service to retrieve relevant client data. Similarly, a who to call (WTC) score engine may access the client activity history and trader interest service. The WTC score engine may utilize machine learning techniques to determine a score for each of the plurality of potential clients, which are then persisted in a WTC score database.

The real-time actionable intelligence generator may then access the WTC scores from the WTC scores database. Likewise, the real-time actionable intelligence generator may access a client coverage data from a client coverage database and actionable intelligence rules from an actionable intelligence rules repository. The real-time actionable intelligence generator may then utilize request data, client activity and trader interest data, WTC score data, client coverage data, as well as actionable intelligence rules data to identify a matching pair. The matching pair may correspond to a potential client and an available request.

An actionable intelligence publisher may then publish the matching pair as actionable intelligence to a user via a plurality of data presentation platforms such as, for example, a web browser and an email. Consistent with disclosures in the present application, the user may act upon insight relating to the matching pair to notify each of the participants and initiate a corresponding transaction. Additionally, the user may also adjust threshold levels for the real-time actionable intelligence generator via the actionable intelligence publisher. The adjusted threshold values may result in updated matching pairs, which are then published for the user. Similarly, the user may also provide feedback to the WTC score engine to improve machine learning models used by the WTC score engine.

Accordingly, with this technology, an optimized process for providing actionable intelligence in real-time to identify recommended transaction participants and facilitate a corresponding transaction is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing actionable intelligence in real-time, the method being implemented by at least one processor, the method comprising:
   generating, by the at least one processor, at least one model by using an artificial neural network;
   training, by the at least one processor using training data, the at least one model;
   assessing, by the at least one processor, the at least one model to determine whether at least one rate is within a predetermined range;
   deploying, by the at least one processor, the at least one model based on a result of the assessment;
   compiling, by the at least one processor, historical activity data for a plurality of potential participants;
   defining, by the at least one processor using the at least one model, at least one score for each of the plurality of potential participants based on the compiled historical activity data by,
      evaluating, by the at least one processor using the at least one model, the compiled historical activity data for each of the plurality of potential participants against a predetermined standard;
   ranking, by the at least one processor, each of the plurality of potential participants based on the at least one score;
   receiving, by the at least one processor via an event stream, at least one request from at least one connected platform, the at least one connected platform including a first-party chat interface and a third-party exchange platform;
   retrieving, by the at least one processor, coverage data that corresponds to the plurality of potential participants, the coverage data including a strategic plan and industry data that corresponds to each of the plurality of potential participants,
      wherein the industry data includes technology data, healthcare data, and industrial data;
   identifying, by the at least one processor, at least one predetermined rule that corresponds to the at least one request,
      wherein the at least one predetermined rule includes a regulatory requirement and an operational policy; and
   automatically determining, by the at least one processor in real-time for the at least one request, at least one recommended participant from the plurality of potential participants based on the at least one score, the coverage data, the corresponding at least one predetermined rule, the ranking, and the historical activity data.

2. The method of claim 1, further comprising:
   generating, by the at least one processor, at least one graphical element, the at least one graphical element including information that relates to at least one from among the at least one recommended participant, the corresponding at least one score, the corresponding coverage data, the corresponding at least one predetermined rule, and the corresponding historical activity data; and
   publishing, by the at least one processor, the at least one graphical element to at least one graphical user interface based on a predetermined user preference.

3. The method of claim 2, further comprising:
receiving, by the at least one processor via the at least one graphical user interface, feedback from at least one user, the feedback including at least one adjustment to a threshold level;
automatically updating, by the at least one processor in real-time, the at least one recommended participant based on the feedback;
generating, by the at least one processor, at least one updated graphical element, the at least one updated graphical element including information that relates to at least one from among the updated at least one recommended participant and the feedback; and
publishing, by the at least one processor, the at least one updated graphical element to the at least one graphical user interface based on the predetermined user preference.

4. The method of claim 1, wherein the historical activity data includes a desired position of at least one trader that is determined based on an associated security instrument that is officially recorded.

5. The method of claim 1, wherein the at least one request includes at least one from among a trade request, a request for quote, an invitation for bid, and an indication of interest.

6. The method of claim 1, wherein the at least one predetermined rule corresponds to at least one from among a predetermined guideline and an automatically generated guideline, the automatically generated guideline relating to a requirement that is derived by using the at least one model, the historical activity data, the at least one score, and the coverage data.

7. The method of claim 6, wherein the at least one model includes at least one from among a machine learning model, a statistical model, a mathematical model, a process model, and a data model.

8. A computing device configured to implement an execution of a method for providing actionable intelligence in real-time, the computing device comprising:
a processor;
a memory; and
a communication interface coupled to each of the processor and the memory,
wherein the processor is configured to:
generate at least one model by using an artificial neural network;
train, by using training data, the at least one model;
assess the at least one model to determine whether at least one rate is within a predetermined range;
deploy the at least one model based on a result of the assessment;
compile historical activity data for a plurality of potential participants;
define, by using the at least one model, at least one score for each of the plurality of potential participants based on the compiled historical activity data by further causing the processor to:
evaluate, by using the at least one model, the compiled historical activity data for each of the plurality of potential participants against a predetermined standard;
rank each of the plurality of potential participants based on the at least one score;
receive, via an event stream, at least one request, the at least one request from at least one connected platform, the at least one connected platform including a first-party chat interface and a third-party exchange platform;
retrieve coverage data that corresponds to the plurality of potential participants, the coverage data including a strategic plan and industry data that corresponds to each of the plurality of potential participants,
wherein the industry data includes technology data, healthcare data, and industrial data;
identify at least one predetermined rule that corresponds to the at least one request,
wherein the at least one predetermined rule includes a regulatory requirement and an operational policy; and
automatically determine, in real-time for the at least one request, at least one recommended participant from the plurality of potential participants based on the at least one score, the coverage data, the corresponding at least one predetermined rule, the ranking, and the historical activity data.

9. The computing device of claim 8, wherein the processor is further configured to:
generate at least one graphical element, the at least one graphical element including information that relates to at least one from among the at least one recommended participant, the corresponding at least one score, the corresponding coverage data, the corresponding at least one predetermined rule, and the corresponding historical activity data; and
publish the at least one graphical element to at least one graphical user interface based on a predetermined user preference.

10. The computing device of claim 9, wherein the processor is further configured to:
receive, via the at least one graphical user interface, feedback from at least one user, the feedback including at least one adjustment to a threshold level;
automatically update, in real-time, the at least one recommended participant based on the feedback;
generate at least one updated graphical element, the at least one updated graphical element including information that relates to at least one from among the updated at least one recommended participant and the feedback; and
publish the at least one updated graphical element to the at least one graphical user interface based on the predetermined user preference.

11. The computing device of claim 8, wherein the historical activity data includes a desired position of at least one trader that is determined based on an associated security instrument that is officially recorded.

12. The computing device of claim 8, wherein the at least one request includes at least one from among a trade request, a request for quote, an invitation for bid, and an indication of interest.

13. The computing device of claim 8, wherein the at least one predetermined rule corresponds to at least one from among a predetermined guideline and an automatically generated guideline, the automatically generated guideline relating to a requirement that is derived by using the at least one model, the historical activity data, the at least one score, and the coverage data.

14. The computing device of claim 13, wherein the at least one model includes at least one from among a machine learning model, a statistical model, a mathematical model, a process model, and a data model.

15. A non-transitory computer readable storage medium storing instructions for providing actionable intelligence in real-time, the storage medium comprising executable code which, when executed by a processor, causes the processor to:
- generate at least one model by using an artificial neural network;
- train, by using training data, the at least one model;
- assess the at least one model to determine whether at least one rate is within a predetermined range;
- deploy the at least one model based on a result of the assessment;
- compile historical activity data for a plurality of potential participants;
- define, by using the at least one model, at least one score for each of the plurality of potential participants based on the compiled historical activity data by further causing the processor to:
  - evaluate, by using the at least one model, the compiled historical activity data for each of the plurality of potential participants against a predetermined standard;
- rank each of the plurality of potential participants based on the at least one score;
- receive, via an event stream, at least one request, the at least one request from at least one connected platform, the at least one connected platform including a first-party chat interface and a third-party exchange platform;
- retrieve coverage data that corresponds to the plurality of potential participants, the coverage data including a strategic plan and industry data that corresponds to each of the plurality of potential participants,
  - wherein the industry data includes technology data, healthcare data, and industrial data;
- identify at least one predetermined rule that corresponds to the at least one request,
  - wherein the at least one predetermined rule includes a regulatory requirement and an operational policy; and
- automatically determine, in real-time for the at least one request, at least one recommended participant from the plurality of potential participants based on the at least one score, the coverage data, the corresponding at least one predetermined rule, the ranking, and the historical activity data.

16. The storage medium of claim 15, wherein, when executed by the at least one processor, the executable code further causes the processor to:
- generate at least one graphical element, the at least one graphical element including information that relates to at least one from among the at least one recommended participant, the corresponding at least one score, the corresponding coverage data, the corresponding at least one predetermined rule, and the corresponding historical activity data; and
- publish the at least one graphical element to at least one graphical user interface based on a predetermined user preference.

17. The storage medium of claim 16, wherein, when executed by the at least one processor, the executable code further causes the processor to:
- receive, via the at least one graphical user interface, feedback from at least one user, the feedback including at least one adjustment to a threshold level;
- automatically update, in real-time, the at least one recommended participant based on the feedback;
- generate at least one updated graphical element, the at least one updated graphical element including information that relates to at least one from among the updated at least one recommended participant and the feedback; and
- publish the at least one updated graphical element to the at least one graphical user interface based on the predetermined user preference.

18. The storage medium of claim 15, wherein the historical activity data includes a desired position of at least one trader that is determined based on an associated security instrument that is officially recorded.

19. The storage medium of claim 15, wherein the at least one request includes at least one from among a trade request, a request for quote, an invitation for bid, and an indication of interest.

20. The storage medium of claim 15, wherein the at least one predetermined rule corresponds to at least one from among a predetermined guideline and an automatically generated guideline,
- wherein the automatically generated guideline relates to a requirement that is derived by using the at least one model, the historical activity data, the at least one score, and the coverage data, and
- wherein the at least one model includes at least one from among a machine learning model, a statistical model, a mathematical model, a process model, and a data model.

* * * * *